US010060646B2

(12) United States Patent
Sane et al.

(10) Patent No.: US 10,060,646 B2
(45) Date of Patent: Aug. 28, 2018

(54) COORDINATED FLOW CONTROL (71) Applicant: Carrier Corporation, Farmington, CT (US)

(72) Inventors: Harshad S. Sane, Southbury, CT (US); Scott A. Bortoff, Brookline, MA (US); Oliver Josserand, La Boisse (FR); Eric Royet, Thil (FR)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 15/632,938

(22) Filed: Jun. 26, 2017

(65) Prior Publication Data
US 2017/0292730 A1 Oct. 12, 2017

Related U.S. Application Data (62) Division of application No. 14/127,531, filed as application No. PCT/US2012/044126 on Jun. 26, 2012, now Pat. No. 9,726,393.
(Continued)

(51) Int. Cl.
G05D 23/00 (2006.01)
F24F 11/30 (2018.01)
F24F 11/83 (2018.01)
F24F 11/00 (2018.01)
F24F 110/10 (2018.01)
(Continued)

(52) U.S. Cl.
CPC ............ F24F 11/30 (2018.01); F24F 11/008 (2013.01); F24F 11/0012 (2013.01); F24F 11/83 (2018.01); F24F 11/84 (2018.01); F24F 11/85 (2018.01); F24F 2011/0082 (2013.01); F24F 2011/0083 (2013.01); F24F 2110/10 (2018.01)

(58) Field of Classification Search
CPC ........ F24F 11/30; F24F 11/83; F24F 11/0012; F24F 2110/10
USPC ......................................... 165/287
See application file for complete search history.

(56) References Cited

U.S. PATENT DOCUMENTS 3,585,481 A 6/1971 Steghart
4,175,398 A 11/1979 Edwards
(Continued)

FOREIGN PATENT DOCUMENTS

CN 1534242 A 10/2004
CN 101788179 A 7/2010
(Continued)

OTHER PUBLICATIONS

Chinese Office Action and Search Report for application CN 201280032027.8, dated Oct. 23, 2015, 4 pages.
(Continued)

Primary Examiner — Ljiljana Ciric
(74) Attorney, Agent, or Firm — Cantor Colburn LLP (57) ABSTRACT A method of coordinated flow control in a heat exchanger system includes adjusting a position of a variable actuator of the heat exchanger system if an associated monitored temperature of the heat exchanger system needs adjustment, determining if the adjusted position of the variable actuator is within a predetermined range of positions, adjusting a position of a discrete actuator of the heat exchanger system if the adjusted position of the variable actuator is not within the predetermined range of positions, and resetting the position of the variable actuator in response to adjusting the position of the discrete actuator.

7 Claims, 6 Drawing Sheets

Related U.S. Application Data (60) Provisional application No. 61/502,690, filed on Jun. 29, 2011.

(51) Int. Cl.
  *F24F 11/84*   (2018.01)
  *F24F 11/85*   (2018.01)

(56) References Cited

U.S. PATENT DOCUMENTS

| | | |
|---|---|---|
| 4,178,988 A | 12/1979 | Cann et al. |
| 4,630,670 A | 12/1986 | Wellman |
| 4,873,649 A | 10/1989 | Grald |
| 5,005,636 A | 4/1991 | Haessig |
| 5,025,638 A | 6/1991 | Yamagishi |
| 5,192,464 A | 3/1993 | Pawlowski |
| 5,203,179 A | 4/1993 | Powell |
| 5,931,227 A | 8/1999 | Graves |
| 6,508,303 B1 | 1/2003 | Naderer |
| 6,679,074 B2 | 1/2004 | Hanson |
| 6,826,921 B1 | 12/2004 | Uselton |
| 7,178,351 B2 | 2/2007 | Varney |
| 7,341,201 B2 | 3/2008 | Stanimirovic |
| 7,380,408 B2 | 6/2008 | Zywiak et al. |
| 7,578,138 B2 | 8/2009 | Varney |
| 9,519,295 B2 | 12/2016 | Burton |
| 2004/0144112 A1 | 7/2004 | He et al. |
| 2005/0150238 A1 | 7/2005 | Helt |
| 2005/0278069 A1 | 12/2005 | Bash |
| 2005/0278071 A1 | 12/2005 | Durham |
| 2006/0161306 A1 | 7/2006 | Federspiel |
| 2007/0227168 A1 | 10/2007 | Simmons et al. |
| 2007/0289322 A1 | 12/2007 | Mathews |
| 2008/0098756 A1 | 5/2008 | Uselton |
| 2008/0110610 A1 | 5/2008 | Lifson et al. |
| 2008/0176503 A1 | 7/2008 | Stanimirovic et al. |
| 2008/0236179 A1 | 10/2008 | Ignatiev et al. |
| 2008/0314064 A1 | 12/2008 | Al-Eidan |
| 2009/0035180 A1 | 2/2009 | Wan |
| 2010/0218527 A1 | 9/2010 | Kitagishi |
| 2011/0138830 A1 | 6/2011 | Unagida |
| 2014/0290928 A1 | 10/2014 | Sane |
| 2015/0068231 A1 | 3/2015 | Rite |
| 2015/0362205 A1 | 12/2015 | Hung |

FOREIGN PATENT DOCUMENTS

| | | |
|---|---|---|
| DE | 19753751 A1 | 8/1999 |
| EP | 1598606 A2 | 11/2005 |
| EP | 2256424 A2 | 12/2010 |
| WO | 2010017033 A2 | 2/2010 |
| WO | 2010141614 A2 | 12/2010 |

OTHER PUBLICATIONS

Ex Parte Quayle for U.S. Appl. No. 14/127,531, Issued Jan. 12, 2017, 17pgs.

Transmittal of the International Search Report and the Written Opinion of the International Searching Authority, or the Declaration, for International Application No. PCT/US2012/04426, dated Nov. 29, 2012, 12pgs.

COORDINATED FLOW CONTROL

PRIORITY

This application is a divisional of U.S. patent application Ser. No. 14/127,531, filed Mar. 14, 2014, which claims the benefit of PCT patent application Ser. No. PCT/US2012/044126, filed Jun. 26, 2012, which claims the benefit of U.S. provisional patent application Ser. No. 61/502,690 filed Jun. 29, 2011. The entire contents of all said applications are incorporated herein by reference.

FIELD OF INVENTION

The subject matter disclosed herein relates generally to the field of heat exchangers, and more particularly to methods of coordinated flow control in heat exchangers.

DESCRIPTION OF RELATED ART

In conventional heat exchanger systems, independent control loops are used to control two or more fluid flows for heat exchange in the system. The control loops are facilitated by separate controllers. The controllers measure an error between a conditioned space's temperature and a desired set-point to calculate required fluid-actuator positions (or commands). For example, two controllers may be used to control a valve and fan in a fan-coil unit.

BRIEF SUMMARY

According to an example embodiment of the present invention, a method of coordinated flow control in a heat exchanger system includes monitoring a temperature of a conditioned space, determining if the monitored temperature needs adjustment, adjusting a position of a variable actuator of the heat exchanger system if the monitored temperature needs adjustment, determining if the adjusted position of the variable actuator is within a predetermined range of positions, adjusting a position of a discrete actuator of the heat exchanger system if the adjusted position of the variable actuator is not within the predetermined range of positions, and resetting the position of the variable actuator in response to adjusting the position of the discrete actuator.

According to another example embodiment of the present invention, a system includes a heat exchanger, a variable actuator in operative communication with the heat exchanger and configured to vary a flow of a first fluid through the heat exchanger in a continuous manner, a discrete actuator in communication with the heat exchanger and configured to vary a flow of a second fluid through the heat exchanger at one of at least two discrete rates, and a controller in communication with the variable actuator and the discrete actuator, wherein the controller is configured to adjust the position of the variable actuator within a range dependent upon a current position of the discrete actuator.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of coordinated flow control are described herein in detail. Technical effects and benefits of such methods include reductions in heat exchanger system wear and system cycling operations thereby, improving system life and performance.

Figure 1:
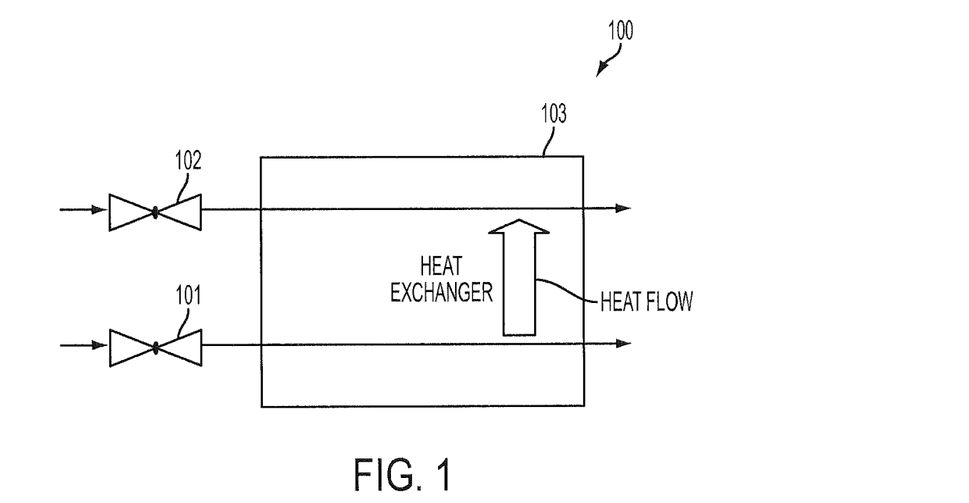
FIG. 1 depicts a heat exchanger.
Figure 2:
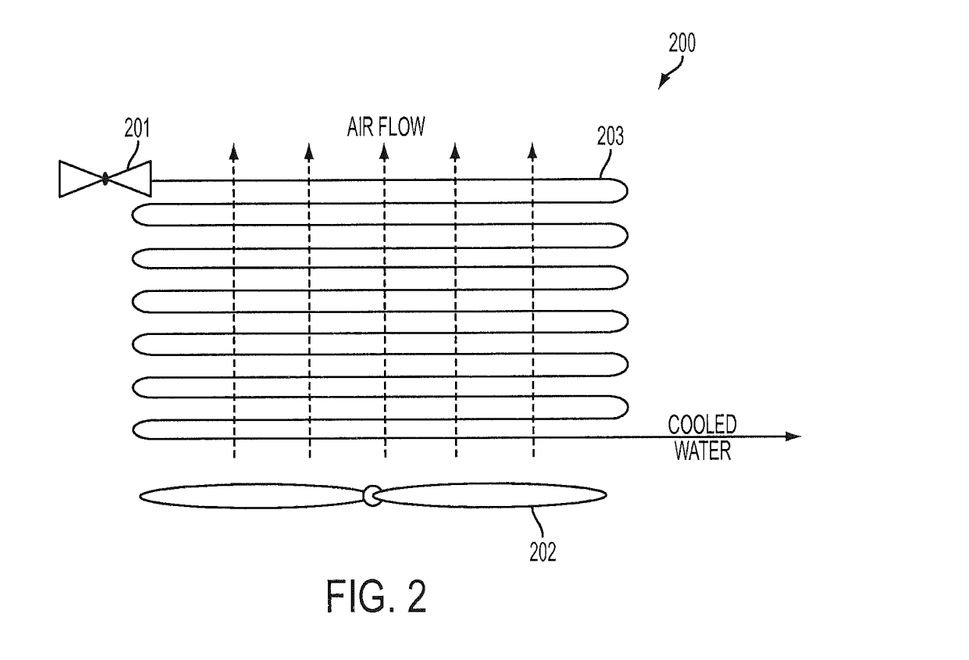
FIG. 2 depicts a fan-coil heat exchanger.

Turning to FIG. 1, a heat exchanger 100 is illustrated. The heat exchanger 100 includes dual actuators 101-102 in fluid communication with a heat exchanging medium 103. The actuators 101-102 may be variable or discrete actuators disposed to control the flow of fluid there-through. As used herein, a variable actuator is an actuator configured to control a flow rate of a fluid in a relatively continuous manner, for example, from about 0%-100% of available flow. Furthermore, as used herein, a discrete actuator is an actuator configured to control a flow rate of a fluid in a relatively discrete manner, for example, through discrete set points of available flow. The actuators 101-102 may be valves, fans, solenoids, pumps or any suitable actuators. For example, a valve actuator may be a valve arranged on piping disposed to limit flow of a fluid through the piping. Further, a fan actuator may be an open or ducted fan disposed to control the flow rate of air over the medium 103. The medium 103 may be any suitable medium, for example, a fan coil arrangement disposed to transfer heat from fluid controlled through actuator 101 (e.g., working fluid or refrigerant) to fluid controlled by actuator 102 (e.g., air). For example, FIG. 2 depicts a fan-coil heat exchanger system 200.

As shown, a variable actuator 201 may control the flow of water through a fan-coil 203. Further, a discrete actuator or fan 202 may control the flow rate of air through the fan-coil 203. Thus, as water flows through the fan-coil 203, air forced over the fan-coil receives heat from the water flowing there-through. In this manner, the water is cooled. According to the particular arrangement shown, the fan 202 may be discretely actuated in one of a plurality of speeds, for example, at least two predetermined speeds, in addition to being switched off (i.e., zero speed). Thus, the fan 202 may turn at a hi-speed or low-speed. In alternate configurations, the fan may be disposed to turn at any number of desired discrete speeds. Further, the actuator 201 may be a variable valve. Thus, the flow rate of water may be controlled at a percentage capacity of the fan-coil 203, for example, from 0%-100%.

The system 200 has a total heat exchange capacity which is dependent on material and physical properties of the fan-coil 203, and the direction and configuration of both air flow through the fan 202 and fluid flow through the fan-coil 203. Generally, the thermodynamic performance of the system 200 can be described in terms of an ability to satisfy the cooling/heating demand of a conditioned space, energy (or power) used by the actuators 201-202, and effectiveness of heat-transfer. Additionally, other criteria including temperature rise across the system 200 and peak power usage can be explicitly penalized. For example, in case of an air-handler system with a chilled water supply, a cost ($) penalty can be imposed for having a low chilled water temperature rise across the heat-exchanger system 200. Depending on any situation, a penalty function can be constructed as a mathematical measure of performance of the heat-exchanger system 200. As used herein, the value of the penalty function at any given time is referred to as the penalty or cost of any described system. In order to minimize the penalty of a system, example embodiments provide an integrated control system to facilitate low-error between a desired temperature for a conditioned space and actual temperature.

Figure 3:
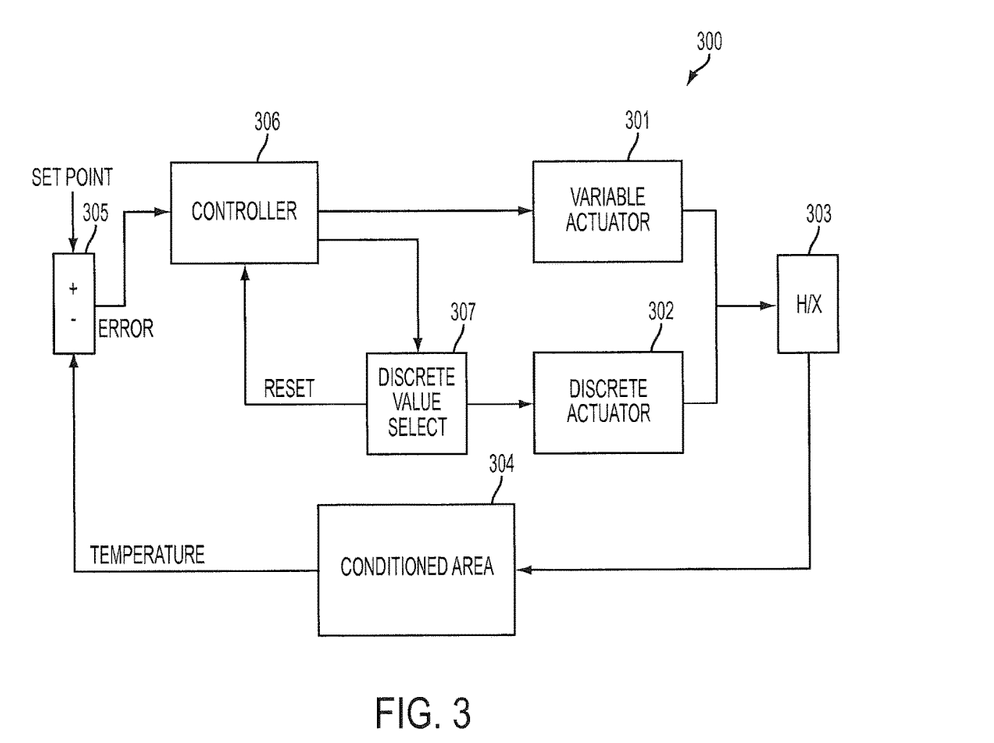
FIG. 3 depicts a heat exchanger control unit, according to an example embodiment.

FIG. 3 depicts a heat exchanger control system, according to an example embodiment. The system 300 includes a continuous or variable actuator 301 and discrete actuator 302. For example, the variable actuator 301 may be disposed to facilitate control of a fluid flowing there-through in a continuous manner. Further, the discrete actuator 302 may be disposed to facilitate control of a fluid flowing there-through in a discrete manner, for example, through use of at least two positions or speeds.

The system 300 further includes heat exchanger 303 in operative communication with the variable actuator 301 and the discrete actuator 302. The heat exchanger 303 may be any suitable heat exchanger as described above. The system 300 further includes conditioned area 304 in communication with the heat exchanger 306.

The system 300 further includes set point calculation portion 305 in communication with the conditioned area 305. For example, the set point calculation portion 305 may receive temperature feedback from the conditioned area 304. Further, the set point calculation portion 304 may receive desired set point information externally, and provide an error value to controller 306. The controller 306 may be in operative communication with the continuous actuator 301, and may adjust the variable positioning of the actuator responsive to the error value received. The system 300 further includes a discrete value selection portion 307 in communication with the controller 306 and the discrete actuator 302. The discrete value selection portion 307 may receive a variable positioning signal from controller 306. Responsive to a value provided by the set point calculation portion 305 through the controller 306, the discrete value selection portion 307 may adjust the discrete actuator 302 to be in any available and appropriate discrete position, and may send a reset signal to the controller 306.

Hereinafter, operation of the system 300 is described more fully with reference to FIGS. 4-8.

Figure 4:
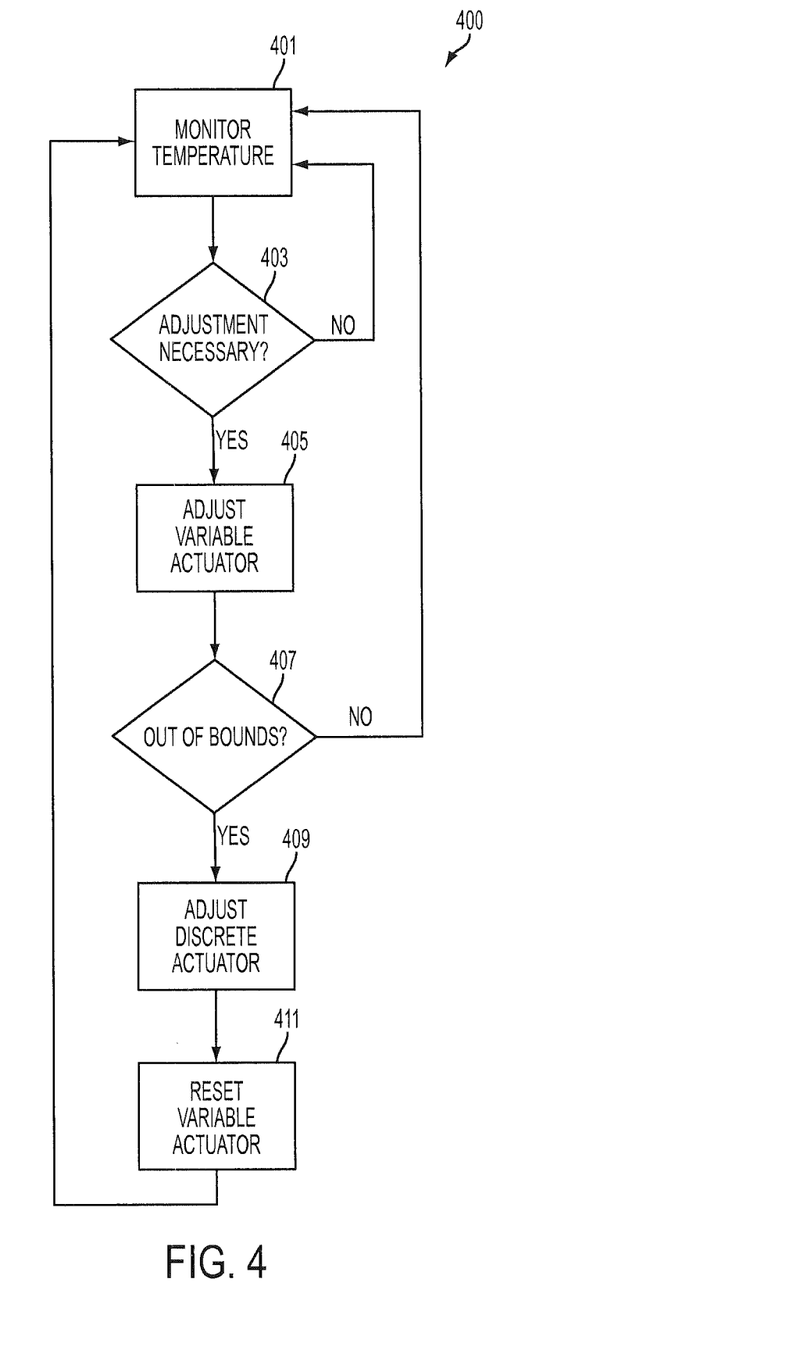
FIG. 4 depicts a method of coordinated flow control, according to an example embodiment.

FIG. 4 depicts a method of coordinated control, according to an example embodiment. The method 400 may include monitoring a temperature of a conditioned space at block 401. For example, the monitoring may be facilitated through the set point calculation portion 305. The method 400 further includes determining if temperature adjustment is necessary at block 403. If adjustment is necessary, the variable actuator 301 is adjusted at block 405. Thereafter, the method 400 includes determining if a position of the variable actuator 301 is out of bounds, or outside of a predetermined or desired range at block 407. If the variable actuator 301 is out of bounds, the method 400 includes adjusting the discrete actuator 302 to an available discrete value at block 409, and resetting the variable actuator 301 based upon the current discrete value of the discrete actuator 302 at block 411.

As noted above, the variable actuator 301 may be monitored to determine if it is within bounds of a predetermined or desired range. This range is dependent upon a current discrete value of the discrete actuator 302. For example, turning to FIG. 8, the discrete actuator 302 includes at least two speeds or discrete settings 801 and 802. As shown, both discrete settings intersect an operation flow range contour at points 810 and 820. It should therefore be appreciated that the same operational heat-exchange capacity may be provided by the system 300 in both of the discrete settings 801 and 802 depending upon a variable actuator position. The variable actuator position may be desired to fall within a particular range based upon the flow capacities provided at each of the settings 801 and 802. For example, the ranges may be chosen based upon energy consumption of either of the variable or discrete actuators or other systems connected to these. These ranges and thus the position or setting of the variable actuator may be determined through the following coordination map:

$$U_n = \begin{bmatrix} u_1 & s_{12} \\ s_{21} & d_2 \end{bmatrix},$$

$$U_{T2} = \begin{bmatrix} u_2 \\ s_{32} \end{bmatrix}$$

Figure 5:
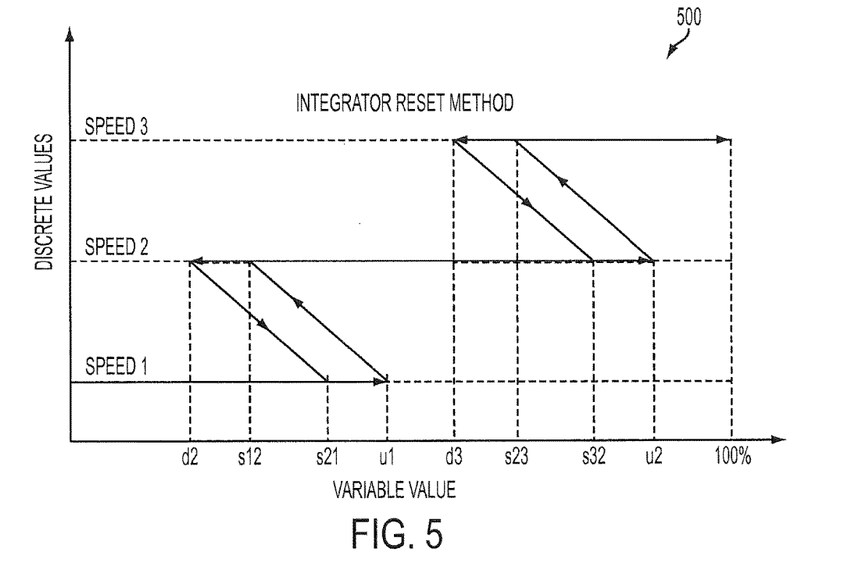
FIG. 5 depicts a method of coordinated flow control, according to an example embodiment.
Figure 6:
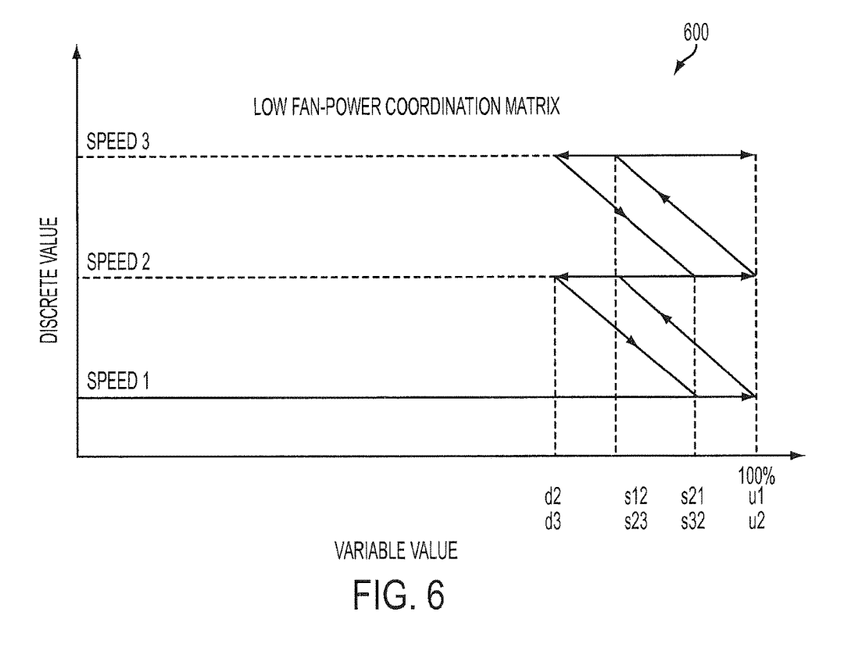
FIG. 6 depicts a method of coordinated flow control, according to an example embodiment.
Figure 7:
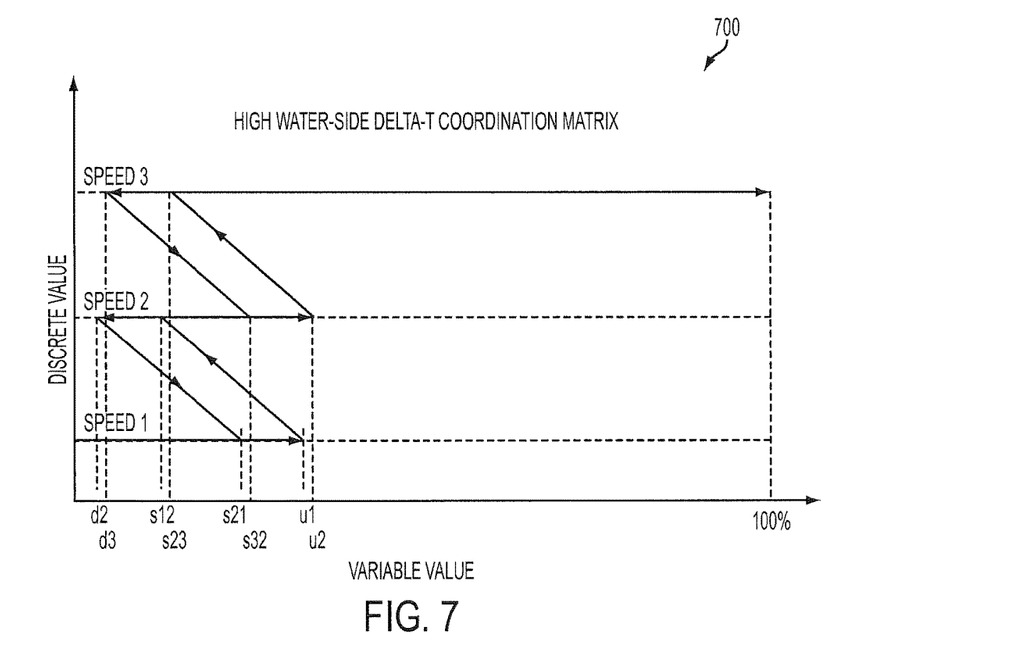
FIG. 7 depicts a method of coordinated flow control, according to an example embodiment.
Figure 8:
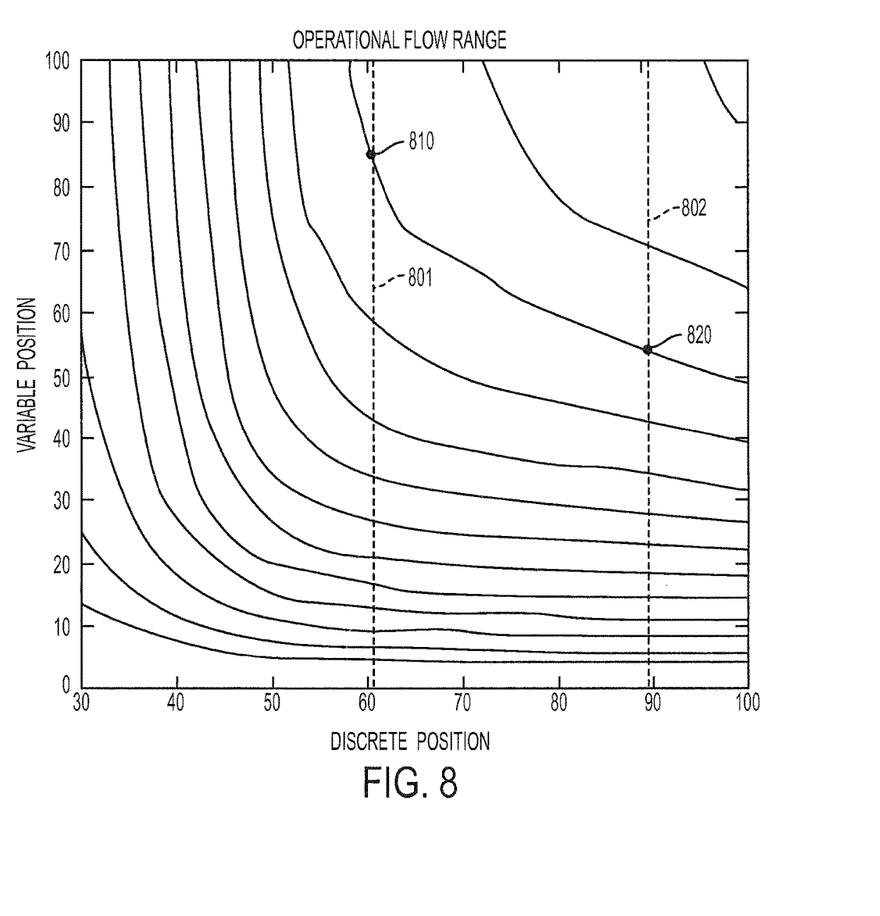
FIG. 8 depicts an example operational flow range contour space with contours representing operation at a fixed heat-exchange capacity.

According to the coordination map, a series of hysteresis loops may be formed as depicted in FIGS. 5-7. The hysteresis loops may provide methodologies as described more fully below.

FIG. 5 depicts a method of coordinated control using a basic integrator reset scheme for determining the range at which to switch and reset the actuators as outlined in method 400. As shown, while actuator 302 is at SPEED 1 and the commanded position of actuator 301 increases beyond u1 (e.g., a switch up), actuator 302 switches up to SPEED 2. At the same or substantially the same time, the position of actuator 301 is reset to value s12. This "reset" to s12 may be achieved by explicitly commanding actuator 301 or changing the value of internal states in controller 306. For example, in case of a PID compensator, the value of the integral state may be switched.

As also shown, while the actuator 302 is at SPEED 2 and the commanded position of actuator 301 increases beyond u2 (e.g., a switch up), actuator 302 switches up to SPEED 3, and the value of actuator 301 is reset to s23. Further, while the actuator 302 is at SPEED 2 and the commanded position of actuator 301 falls below d2 (e.g., a switch down), actuator 302 switches down to SPEED 1 and actuator 301 is reset to s21.

As also shown, while the actuator 302 is at SPEED 3 and the commanded position of actuator 301 falls below d3 (e.g., switch down), actuator 302 switches down to SPEED 2 and actuator 301 is reset to s32.

During implementation of the method 500, the controller 306 maintains low error between a desired temperature and actual temperature monitored at set point calculation portion 305. Furthermore, according to the coordination matrix outlined above, the switch points s12, s21, s23, s32 are chosen to yield minimal change in heat-exchange (cooling or heating) capacity following a change in actuator 302's position. The values of u1 and s12 may be chosen such that the heat-capacity of the system in 100 does not change upon switch. SPEED 1 and u1 can correspond to point 810 in FIG. 8, while SPEED 2 and s12 may correspond to point 820 in FIG. 8. This results in significantly better temperature control. Additionally, values of s12, s21, s23, s32 may be chosen to minimize switching of the actuator 302. This reduces wear, system cycling and improves systems life and performance. Such is illustrated in FIG. 6.

FIG. 6 depicts a method of coordinated flow control using a low discrete-actuation scheme for determining the range at which to switch and reset the actuators as outlined in method 400. The coordination map shown above includes settings' values configured to enforce the actuator 302 to operate in SPEED 1 for most actuator 301's positions. This results in lower discrete actuator power consumption which may be important for a particular kind of penalty function.

According to the method 600, while actuator 302 is at SPEED 1 and the commanded position of actuator 301 increases beyond u1 (e.g., a switch up), actuator 302 switches up to SPEED 2. At the same or substantially the same time, the position of actuator 301 is reset to value s12. As also shown, while the actuator 302 is at SPEED 2 and the commanded position of actuator 301 increases beyond u2 (e.g., a switch up), actuator 302 switches up to SPEED 3, and the value of actuator 301 is reset to s23. Further, while the actuator 302 is at SPEED 2 and the commanded position of actuator 301 falls below d2 (e.g., a switch down), actuator 302 switches down to SPEED 1 and actuator 301 is reset to s21. Finally, while the actuator 302 is at SPEED 3 and the commanded position of actuator 301 falls below d3 (e.g., switch down), actuator 302 switches down to SPEED 2 and actuator 301 is reset to s32.

During implementation of the method 600, the controller 306 maintains low error between a desired temperature and actual temperature monitored at set point calculation portion 305, while reducing the actual use of the actuator 302. Additionally, values of s12, s21, s23, s32 may be chosen to minimize switching of the actuator 301. This may also reduce wear, system cycling and improves systems life and performance. Such is illustrated in FIG. 7.

FIG. 7 depicts a method of coordinated flow control using a low variable-actuation coordination scheme for determining the range at which to switch and reset the actuators as outlined in method 400. As illustrated, the method 700 enforces low-use of actuator 301 thereby yielding higher water-side temperature change. This may be important for efficient chiller or boiler operation.

According to the method 700, while actuator 302 is at SPEED 1 and the commanded position of actuator 301 increases beyond u1 (e.g., a switch up), actuator 302 switches up to SPEED 2. At the same or substantially the same time, the position of actuator 301 is reset to value s12. As also shown, while the actuator 302 is at SPEED 2 and the commanded position of actuator 301 increases beyond u2 (e.g., a switch up), actuator 302 switches up to SPEED 3, and the value of actuator 301 is reset to s23. Further, while the actuator 302 is at SPEED 2 and the commanded position of actuator 301 falls below d2 (e.g., a switch down), actuator 302 switches down to SPEED 1 and actuator 301 is reset to s21. Finally, while the actuator 302 is at SPEED 3 and the commanded position of actuator 301 falls below d3 (e.g., switch down), actuator 302 switches down to SPEED 2 and actuator 301 is reset to s32.

In the examples described above and depicted in FIGS. 5-7, the "switch up" point u1 of the lower hysteresis loop is less than the "switch up" point u2 of the upper hysteresis loop. Furthermore, the "switch down" point s32 of the upper hysteresis loop is greater than the "switch down" point d2 of the lower hysteresis loop. These two restrictions result in appropriate functionality these examples.

Additionally, according to some example embodiments, an appropriate mapping for choosing hysteresis loop switch points may be choosing switch points such that four conditions are met: (1) capacity @(u1,SPEED1)=capacity @(s12, SPEED2); (2) capacity @(s12,SPEED1)=capacity @(d2, SPEED2); (3) capacity @(u2,SPEED2) capacity @(s23, SPEED3); and (4) capacity @(s32,SPEED2)=capacity @(d3,SPEED3), where capacity, for example, may be determined with reference to FIG. 8, where points 810 and 820 lie on the same capacity curve thereby denoting the same capacity.

As described above, example embodiments of the present invention provide methods and systems for efficient flow control which may be arranged according to a coordination matrix configured to promote efficient cooling while reducing wear on system components. The methods and schemes described herein may reside in several or all of heat exchangers in a network served by a common cooling or heating source, such as a chiller, boiler or refrigeration unit. Hence, the coordination matrices may be enforced at a global level, and penalty and cost may be likewise monitored globally.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of coordinated flow control in a heat exchanger system, comprising: adjusting a position of a variable actuator of the heat exchanger system if an associated monitored temperature of the heat exchanger system needs adjustment;
   determining if the adjusted position of the variable actuator is within a predetermined range of positions;
   adjusting a position of a discrete actuator of the heat exchanger system if the adjusted position of the variable actuator is not within the predetermined range of positions; and
   resetting the position of the variable actuator in response to adjusting the position of the discrete actuator.

2. The method of claim 1, further comprising determining an amount of error between a predetermined set-point temperature of the conditioned space and an actual temperature of the conditioned space.

3. The method of claim 2, further comprising determining if the amount of error is within a predetermined error acceptability.

4. The method of claim 2, wherein adjusting the position of the variable actuator includes increasing or decreasing a flow of fluid controlled by the variable actuator to reduce the amount of error.

5. The method of claim 1, wherein determining if the adjusted position of the variable actuator is within the predetermined range of positions includes:

comparing a current position of the variable actuator and a current position of the discrete actuator to a coordination matrix to determine the predetermined range of positions.

6. The method of claim 5, wherein if the current position of the variable actuator is greater than a maximum value of the predetermined range of positions, the position of the discrete actuator is increased and the position of the variable actuator is decreased during the resetting.

7. The method of claim 5, wherein if the current position of the variable actuator is less than a minimum value of the predetermined range of positions, the position of the discrete actuator is decreased and the position of the variable actuator is increased during the resetting.

* * * * *